United States Patent
Feller et al.

(10) Patent No.: US 8,747,756 B2
(45) Date of Patent: Jun. 10, 2014

(54) REACTOR AND METHOD FOR CONTINUOUS POLYMERIZATION

(75) Inventors: Rolf Feller, Mettmann (DE); Hanns-Ingolf Paul, Leverkusen (DE); Paul Wagner, Düsseldorf (DE); John Lovegrove, Sarnia (CA); Jörg Kirchhoff, Köln (DE); Joachim Ritter, Leverkusen (DE); Ricarda Leiberich, Neu-Isenburg (DE); Udo Wiesner, Brasschaat (BE)

(73) Assignee: LANXESS International SA, Granges-Paccot (CH)

( * ) Notice: Subject to any disclaimer, the term of this patent is extended or adjusted under 35 U.S.C. 154(b) by 104 days.

(21) Appl. No.: 13/381,152

(22) PCT Filed: Jul. 1, 2010

(86) PCT No.: PCT/EP2010/059385
§ 371 (c)(1),
(2), (4) Date: Aug. 17, 2012

(87) PCT Pub. No.: WO2011/000922
PCT Pub. Date: Jan. 6, 2011

(65) Prior Publication Data
US 2012/0302706 A1    Nov. 29, 2012

(30) Foreign Application Priority Data
Jul. 1, 2009  (EP) .................................... 09008616

(51) Int. Cl.
*B01J 19/00*  (2006.01)
*C08F 2/00*  (2006.01)

(52) U.S. Cl.
USPC ............................. 422/131; 422/138; 526/64

(58) Field of Classification Search
USPC .................................... 422/131, 138; 526/64
See application file for complete search history.

(56) References Cited

U.S. PATENT DOCUMENTS 3,031,273 A    4/1962  Latinen
3,261,391 A    7/1966  Gudheim
(Continued)

OTHER PUBLICATIONS

International Search Report dated Dec. 2, 2010 for PCT/EP2010/059263.

*Primary Examiner* — William Cheung
(74) *Attorney, Agent, or Firm* — Jennifer R. Seng (57) ABSTRACT

The present invention relates to a reactor (10) and a process for continuous polymerization, where the reactor (10) has an essentially tubular reactor housing (16). The reactor housing (16) has a drive (38) which runs along the geometric central axis (12) in the flow direction (22) and is configured as a central shaft. A rotatably arranged scraper or wiper (36) is provided within the reactor housing (16); the scraper or wiper (36) has at least one scraper or wiper blade (42) to run along an interior side (44) of the reactor housing (16). The rotational movement of the scraper or wiper (36) results in radial mixing of a stream within the reactor housing (16) which dominates gravity effects and, by virtue of shaping of the scrapers or wipers, optionally makes plug flow or backflow within the reactor (10) possible. This allows the reaction conditions in the axial direction of the reactor housing (16) to be predicted and individually suitable reaction conditions to be set and controlled along the reactor housing, so that, in particular, a desired molecular weight distribution can be set.

25 Claims, 10 Drawing Sheets

(56) References Cited

U.S. PATENT DOCUMENTS

| | | | |
|---|---|---|---|
| 3,354,136 A | * | 11/1967 | Crawford ..................... 526/65 |
| 3,495,951 A | | 2/1970 | Tanaka et al. |
| 3,820,960 A | * | 6/1974 | Platz et al. .................... 422/137 |
| 4,282,925 A | | 8/1981 | Hay et al. |
| 4,383,093 A | | 5/1983 | Shiraki et al. |
| 2009/0175121 A1 | | 7/2009 | Rausch et al. |

* cited by examiner

REACTOR AND METHOD FOR CONTINUOUS POLYMERIZATION

This is a U.S. National Phase Application under 35 U.S.C. & 371 of International Patent Application No. PCT/EP10/59385 filed Jul. 10, 2010, which claims foreign priority of EPO 09008616.6 filed Jul. 1, 2009, the specification of which is incorporated by reference herein.

The present invention relates to a reactor, especially a tube reactor, its use in a process for the continuous preparation of polymers, in particular synthetic rubbers, and also the above-mentioned process itself.

U.S. Pat. No. 4,282,925 discloses a heat exchanger which has an essentially tubular housing having a vertical central shaft. The heat exchanger has a scraper which, with the aid of scraper blades, runs along an interior side of the housing.

A disadvantage of such a heat exchanger is that it is difficult to use as tube reactor for a continuous polymerization since the reaction conditions can be monitored and influenced only with great difficulty. In particular, it is not readily possible to set a desired molecular weight distribution.

It is an object of the invention to provide a reactor and also a process for continuous polymerization by means of which the reaction conditions of the polymerization can be influenced more readily and in particular the setting of a desired molecular weight distribution can be made easier.

The object is achieved according to the invention by a reactor having the features of claim 1 and also a process having the features of claim 17. Preferred embodiments of the invention are indicated in the dependent claims.

The reactor of the invention for continuous polymerization, which can be used, in particular, for the preparation of synthetic rubbers by polymerization, comprises at least one essentially tubular reactor housing having a drive which is connected to at least one scraper or wiper which is arranged so as to be rotatable within the reactor housing, where the scraper or wiper has at least one scraper or wiper blade to run along an interior side of the reactor housing.

It should additionally be noted that, in the context of the invention, the term "scraper" or "wiper" also includes those elements which, in operation, assume an angle with respect to the inside of the reactor housing of exactly 90°.

The distance of the scraper or wiper blade from the inside of the reactor housing is, for example, 0 or more than 0 to 1%, preferably 0 or more than 0 to 0.5%, based on the radial diameter of the reactor housing. In one embodiment, in which the distance of the scraper or wiper blade from the inside of the reactor housing is 0%, i.e. exists in the contact between scraper or wiper blade and the inside of the reactor housing, the inside of the reactor housing is fully scraped and hence good heat transfer is ensured from the reaction medium through the reactor housing to the cooling medium, since the formation of polymer deposits, also known as gels, can be effectively avoided. Also in the case of the abovementioned distances from the scraper or wiper blade from the inside of the reactor housing, in an alternative embodiment, the good heat transfer is preserved. What is advantageous about this embodiment is the fact that lower mechanical forces act on scrapers or wipers as a resulting of the circulating motion, which prolongs their lifetime.

The drive can, for example, be configured as a shaft which can, for example, be configured as a central shaft running essentially along the geometric central axis or as an eccentric shaft. For the purposes of the invention, an eccentric shaft is, for example, a shaft which has a cage mounted so as to be rotatable about the geometric central axis of the reactor or has an appropriate rod assembly, where the cage or the rod assembly has at least one scraper which is arranged so as to be rotatable within the reactor housing and where, at least partly, preferably at least predominantly, a central shaft running along the geometric central axis is not present.

The shafts can, if appropriate, themselves be coolable or have means which allow starting materials to be introduced via the shaft into the interior space of the reactor housing.

To promote the heat transfer and the radial and axial mixing, the inside of the reactor housing may have at least one, preferably 2 to 16, particularly preferably stators, which act as baffles and prevent rotation.

In a further embodiment, the reactor has
a central axis which runs at least predominantly along the geometric central axis and is preferably coolable and
stators which are configured such that they have a distance from the central shaft of, for example, 0 or more than 0 to 1%, preferably 0 or more than 0 to 0.5%, based on the radial diameter of the reactor housing.

Stators are understood in the context of the invention to mean fixed, immobile internals connected to the inside of the reactor housing, for example metal sheets or plates, which have, for example, an angle relative to the geometric central axis of 0 to 90', preferably of 0 to 60°, more preferably of 0 to 50°.

Analogously to the scrapers and wipers, or the scraper and wiper blades, the stators may be configured such that they scrape or wipe the central shaft. The distance of the stator from the shaft is then, for example, 0 or more than 0 to 1%, preferably 0 or more than 0 to 0.5%, based on the radial diameter of the reactor housing.

In a further embodiment, the reactor, especially a tube reactor, is arranged not upright but essentially horizontally, i.e. with the geometric central axis of the reactor housing essentially horizontal. In this way, gravity-induced flows in and counter to the flow direction can be avoided. In principle, however, any inclination and alignment is conceivable. An essentially horizontal geometric centre axis is understood to mean an axis which deviates from the horizontal direction by a maximum of 10°, preferably less than 5°. The same analogously applies to the term "essentially vertical".

According to the invention, it is possible to avoid or at least significantly reduce different flow velocities in the flow direction. In particular, in some embodiments, loop flow can be avoided. This makes it possible to predict the local reaction conditions in the flow direction along the reactor housing taking into account the residence time of the stream within the reactor housing and the reaction kinetics. It is thus possible, for example, to calculate possible local starting material concentrations, product concentrations and also heat of reaction evolved along the reactor housing beforehand. Owing to the more precise knowledge of the various reaction situations along the flow path, it is possible to undertake locally different measures in order to influence the polymerization reaction. For example, it is possible to identify a subregion of the reactor housing where a particularly high reaction rate which could lead to a correspondingly high evolution of heat (exothermic reaction) or a correspondingly high heat requirement (endothermic reaction) is to be expected. In this region in particular, appropriately high heat transfer between the stream within the reactor housing and a heat transfer medium can be established by means of a heat exchanger in order to be able to maintain an optimal reaction temperature. At the same time, it is possible to avoid excessively high heat transfer in regions in which only small temperature changes, if any, in the stream are to be expected. In this way, the reaction conditions can be influenced in an energy-efficient manner at specific relevant points in order to achieve, in particular, a desired temperature profile and therefore a suitable molecular weight distribution of the polymerization product. The reaction conditions of the polymerization can be controlled and influenced more readily and the establishment of a desired molecular weight distribution in respect of position, width and shape is made easier.

Alternatively, it is additionally also possible to generate plug flow by means of axial scrapers or wipers and/or stators. By virtue of inclination or configuration of the scrapers or wipers and/or stators, it is possible to generate controlled axial velocities on the inside of the reactor and/or the shaft surface. For this purpose, the scrapers or wipers and/or stators are shaped or aligned in a suitable manner known per se to those skilled in the art. For example, a slight adjustment of stators relative to the geometric central axis of the reactor housing leads to the imparting of axial velocities. The angle relative to the geometric central axis in this embodiment is, for example, 15 to 60°, preferably 20 to 50°.

Furthermore, formation of deposits such as encrustations, caked material, polymer gels or the like on the interior side of the reactor housing which influence heat transfer through the reactor housing in an uncontrolled way are avoided, according to the invention, by means of the scraper or the wiper. In addition, the rotary movement of the scraper and the movement of the scraper blade in the circumferential direction lead to additional mixing in the radial direction. Any stators fixed on the inside of the reactor housing promote the avoidance of deposits through their redispersing action in interplay with the scrapers or wipers. Thus, essentially homogeneous reaction conditions can be obtained for each individual section along the central axis of the reactor housing. At the same time, the formation of flow boundary layers on the interior side of the reactor housing is prevented and heat transfer is significantly improved as a result of the flows in the radial direction. The rotary movement of the scraper results in radial mixing of a flow within the reactor housing which dominates gravity effects and optionally allows plug flow or loop flow, up to and including completely backmixed flow, within the tube reactor. This allows the reaction conditions in the axial direction of the reactor housing to be predicted and individually appropriate reaction conditions to be set and controlled along the reactor housing so that, in particular, a desired molecular weight distribution can be set. In the case of establishment of plug flow, the further advantage arises that "hotspots" in the course of polymerization can be avoided at the entry sites of the reactants, such as especially that of the catalyst, as a result of the dilution which occurs as a result of plug flow.

The reactor housing is particularly preferably connected to a transport device for transporting starting materials into the reactor housing and/or for transporting products out of the reactor housing, where the throughput of the transport device can be set in such a way that essentially plug flow is established within the reactor housing. The plug flow avoids backmixing in a direction counter to the flow direction. The plug flow can be established by the transport device sucking and/or pushing the stream through the reactor housing along the geometric central axis of the reactor housing. Due to the scraper which prevents formation of boundary layers on the interior side of the reactor housing, a comparatively low flow velocity is sufficient to achieve plug flow. As a result, comparatively high residence times of the stream in the tube reactor can be achieved without the plug profile of the flow being impaired.

For the purposes of the present invention, starting materials are the materials which enter the tube reactor, while products are the materials leaving the tube reactor. Examples of starting materials are the monomers or monomer mixtures used for preparing synthetic rubbers, the catalysts which may be required for the polymerization, and also solvents and optionally additives. The starting materials can be introduced into the reactor housing of the tube reactor via a common inlet or via a plurality of different inlets, in particular at various axial or tangential positions.

The speed of rotation and shape of the scraper or wiper are preferably set so that, optionally in an axial subregion of the reactor housing, only a velocity component in the radial direction and/or in the circumferential direction can be imparted to a flow in the reactor housing by the scraper blade. For example, only a velocity component in the radial direction and/or in the circumferential direction can be imparted to a flow in the reactor housing by the scraper or wiper blade in the entire region through which the scraper or wiper blade travels. For this purpose, the scraper or wiper blade is aligned essentially perpendicular to its movement in the circumferential direction so that the power input of the scraper or wiper does not impart any additional velocity component in or counter to the flow direction of the tube reactor. The scraper or wiper blade can be aligned essentially parallel to the geometric central axis of the reactor housing. At the same time, the rotational speed of the scraper or wiper is set so that excessive turbulence which could cause significant velocity components along the flow direction is avoided. This results in a calculatable profile of the reaction conditions in the flow direction, and this profile remains constant relative to the reactor housing during continuous flow through the reactor. When the reactor has stators, the stators in this embodiment are likewise aligned essentially parallel to the geometric centre axis of the reactor housing, in order to avoid axial velocity components.

In a further embodiment, a velocity component either in the radial direction and/or in the circumferential direction, or in the axial direction, can be imparted to a flow in the reactor housing by the scraper or wiper blade in the entire region through which the scraper or wiper blade travels. The scraper or wiper blade may in that case be inclined relative to the geometric centre axis of the reactor housing, in which case an angle relative to the geometric centre axis of more than 0 to 60°, preferably of 20 to 60°, particularly preferably 20 to 45°, is formed.

When the reactor has stators, the stators in this embodiment are either aligned essentially parallel to the geometric centre axis of the reactor housing or likewise have an inclination, which allows axial velocity components to be amplified.

In a preferred embodiment, at least two, preferably at least three or at least four, heat exchangers for setting the temperature of a flow provided within the reactor housing are arranged in the axial direction of the reactor housing, where the heat exchangers are separated from one another in such a way that a different temperature can be set for each heat exchanger. The temperature of the stream within the reactor housing can be influenced and set from outside the reactor housing by means of the respective heat exchangers. Depending on the expected profile of the reaction conditions within the reactor housing, a suitable temperature can be selected individually for each heat exchanger in order, for example, to provide a constant temperature within the reactor housing taking into account the heat of reaction to be expected.

At the edges of zones with different wall temperatures, it is possible with preference to use scrapers or wipers which in particular impart radical or tangential velocity components, such that differently heated reaction zones can additionally be mixed. It is also possible to connect heat exchangers in series in order to feed the entire stream or part of the stream from one heat exchanger to the other heat exchanger. The other heat exchanger can, in particular, have a further inlet for introducing a heat transfer medium having a temperature which is different from the stream introduced into the first heat exchanger. Despite dynamically changing reaction conditions along the flow path within the reactor housing, the temperature can in this way be kept essentially constant within the reactor housing. This makes it possible to achieve an intended molecular weight distribution which has a comparatively low scatter. For example, in the preparation of synthetic rubbers which is typically carried out at from −100 to −30° C., each desired temperature can be set within the abovementioned range by means of vaporizing ethylene or other liquids which are vaporizable at the abovementioned temperatures as a function of the selected pressure. Alternatively, liquid coolants at different temperatures can be used.

In a further embodiment the liquid coolant is using in a single phase i.e. without evaporation. As a consequence a rise in temperature occurs between inlet and outlet. The advantage of this embodiment is a constant heat exchange on the coolant side. Applicable coolants are ethylene, ethane, propane, isobutene etc or commercially available coolants.

In a further embodiment, the tube reactor can have two or more reaction spaces which are in each case separated by an intermediate plate but communicate via openings, where in this case at least one heat exchanger, preferably at least two heat exchangers are provided per reaction space in the axial direction of the reactor housing to set a temperature within each reaction space.

If the reactor, especially the tube reactor, is aligned horizontally, a comparatively narrow ebullition layer is additionally formed for the vaporizing liquid, for example ethylene, owing to the hydrostatic pressure which occurs, so that an even higher heat transfer efficiency can be achieved for the heat exchanger.

The reactor housing can be made of all materials known to those skilled in the art which have and retain sufficient strength and corrosion resistance under the reaction conditions, for example commercial steel. In the case of low-temperature applications, e.g. at from −100° to −30° C., austenitic steel, for example, is suitable.

The reactor housing is preferably made of stainless steel 1.4571 or similar resistant steels which are customary in the chemical industry.

The interior side of the reactor housing which comes into contact with the reaction medium preferably consists of stainless steel 1.4404 with a reduced proportion of Ti for better polishing properties of the interior surface.

The heat exchanger preferably has an outer wall surrounding part of the reactor housing and in particular a spiral dividing wall is arranged between the outer wall and the reactor housing to form a spiral heat exchanger channel. A measure which is structurally simple to implement makes it possible for a heat transfer medium to flow in a spiral path along the reactor housing and thus exchange heat with the stream within the reactor housing for a correspondingly long time. This allows a particularly large heat flow which can be exchanged between the stream within the reactor housing and the heat transfer medium. Such a configuration of the heat exchanger with a spiral heat exchanger channel is particularly advantageous for single-phase heat transfer media which do not undergo a phase change, for example vaporization and/or condensation, on taking up and/or giving off heat. In the case of heat transfer media which undergo a phase change, for example vaporization and/or condensation, on taking up and/or giving off heat, the dividing wall is, in particular, omitted so that very high turbulence can occur within the heat exchanger due to the phase change. At the same time, the inner boundary of the heat exchanger is formed by the reactor housing itself. Additional resistance to heat flow between the stream within the reactor housing and the heat exchanger is avoided in this way. The heat transfer medium can, for example, be conveyed in countercurrent to the stream within the reactor housing or else in the flow direction, e.g. when high cooling power is necessary at the beginning of the polymerization, i.e. upstream.

A ratio of an interior area A of the tubular reactor housing to a volume V of the tubular reactor housing is particularly preferably such that $0.1\ m^2/m^3 \leq A/V \leq 100\ m^2/m^3$, preferably $1\ m^2/m^3 \leq A/V \leq 50\ m^2/m^3$, particularly preferably $5\ m^2/m^3 \leq A/V \leq 30\ m^2/m^3$, very particularly preferably $10\ m^2/m^3 \leq A/V \leq 30\ m^2/m^3$. Due to the scraper which prevents the formation of boundary layers on the interior side of the reactor housing, it is possible to provide a comparatively slim tube reactor whose reactor housing has a comparatively large interior area based on the volume enclosed, especially when the shaft is likewise designed to be coolable and is itself scraped or wiped by stators. Owing to the comparatively large interior area A of the tubular reactor housing, a correspondingly high heat transfer power can be installed over the outer side of the reactor housing. At the same time, an essentially homogeneous temperature distribution in the radial direction can be achieved more easily. At the same time, the tube reactor can withstand greater internal pressures, without any need to select an excessively high wall thickness. This makes it possible also to set and control the reaction parameters over a greater pressure range.

In a preferred embodiment, the scraper or wiper has at least two, preferably from 2 to 8, subscrapers or -wipers which are connected to one another in an articulated manner in the axial direction, for example via bearing devices which are adequately known to a person skilled in the art, for example via a multipod, e.g. a tripod, supported against the reactor housing. The scraper or wiper can in this way be divided into a plurality of small parts which, owing to the articulated way in which they are connected, more easily follow the shape profile of the tubular reactor housing. In particular, it is possible to follow deformations of the reactor housing, in particular curvatures due to thermal expansion effects, without the scraper blade becoming slanted relative to the interior side of the reactor housing. For example, three legs of the tripod which can be supported against the interior side of the reactor housing at three points make it possible to ensure that the respective subscraper is arranged centrally between two tripods. The tripod can be made stationary or can rotate at least partly together with the scraper or wiper. Should the reactor housing bend because of heat expansion effects, the respective subscraper or -wiper is automatically adapted to the new shape profile. Even when the reactor housing is slightly curved due to heat expansion effects, plug flow is not significantly disrupted by the scraper.

The scraper or scrapers or wiper or wipers can be driven via the drive, with the transmission of force being able to be brought about by means of mechanical or magnetic coupling.

When shafts are used for mechanical force transmission, these are preferably sealed by means of a double-acting sliding ring seal arranged between the shaft and the reactor housing, where the sliding ring seal contains, in particular, a barrier medium which is inert under the polymerization conditions. The sliding ring seal can enclose an annular chamber space which can be filled with the barrier liquid between its two sliding surfaces. The barrier liquid, which is particularly preferably under superatmospheric pressure, can lubricate both parts of the sliding ring pairing. This avoids deposition of starting materials and/or products on the sliding surfaces, which could cause leaks. In the preparation of synthetic rubbers, the intrusion of water, for example atmospheric moisture from the ambient air, into the interior of the reactor housing can be avoided. Slowing of the polymerization reaction within the reactor housing as a result of intrusion of water and any catalyst deactivation associated therewith is avoided in this way. As barrier medium, it is possible to use, for example, a solvent which is also used in the polymerization reaction.

The scraper or wiper blade preferably has a surface having a coefficient of friction which is lower than that of steel; the scraper or wiper blade consists, for example, of fluorine-containing polymers and/or similar materials, for example polyether ether ketone (PEEK), contains these or is coated therewith, preferably consists of fluorine-containing polymers or is coated therewith. Preferred fluorine-containing polymers are polytetrafluoroethylene (PTFE), polyvinylidene fluoride (PVDF) and ethylene-tetrafluoroethylene copolymer (ETFE).

The same applies in the case that the stators are designed for the scraping or wiping of the centre shaft.

As a result of the reduced friction between the scraper or wiper blade and the interior side of the reactor housing, frictional losses during operation of the scraper or wiper can be reduced. At the same time, particularly in the case of relatively high speeds of rotation of the scraper or wiper, the heat of friction on the interior side of the reactor housing can be reduced. In particular, the surface of the scraper or wiper blade can have such a nature that gel scraped off does not preferentially remain on the scraper blade but instead quickly becomes detached from the scraper blade. The scraped-off or wiped-off gel can as a result be easily returned to the stream and be suspended in the stream.

The scraper or wiper blade is preferably inclined and/or curved relative to a radially directed line running through the geometric central axis, where the scraper or wiper blade has a fastening head directed radially inward and a radially outward-directed force can be applied to the scraper or wiper blade, in particular to the fastening head. The inclination of the scraper or wiper blades relative to the radial may, for example, be in the range from more than 0 to 90°, preferably 20 to 60° and particularly preferably 30 to 50° in any direction. The application of force can be, for example, by means of spring force, hydraulic forces, elastic forces or centrifugal forces or a plurality of the abovementioned forces. The inclined or curved design of the scraper or wiper blade in the region of contact with the interior side of the reactor housing prevents polymerized product from blocking or conglutinating a gap between the scraper blade and the reactor housing. Unnecessarily high torques for the scraper or wiper are avoided thereby. The radially outward-directed force enables a sufficiently high pressing-on force of the scraper or wiper blade onto the reactor housing to be applied in order to scrape off or wipe off deposits, in particular gel, from the interior side of the reactor housing. At the same time, the scraper or wiper blade can have a radially inward deflection in order not to block rotation of the scraper or wiper in the case of unevennesses in the reactor housing and/or excessively solid deposits. The curved or inclined design of the scraper or wiper blade enables, in particular, an avoidance motion of the scraper or wiper blade, which occurs only partly in the radial direction and has a component of movement lateral to the radial direction to be provided. In addition or as an alternative, the scraper or wiper blade can be chamfered. This avoids knocking of the scraper or wiper blade against a solid encrustation, which can lead to blocking of the scraper or wiper since the scraper or wiper blade can, owing to the angled edge, be lifted over the encrustation against the radially outward-applied force.

In particular, at least two scraper or wiper blades are arranged in the axial direction, where the scraper or wiper blades are offset by an angle $\alpha$ in the circumferential direction and the angle $\alpha$ is in particular such that $30°\leq\alpha\leq150°$, preferably $45°\leq\alpha\leq135°$, more preferably $60°\leq\alpha\leq120°$ and particularly preferably $\alpha=90°\pm2°$. The offset arrangement of the scraper or wiper blades results in a plurality of support points of the scraper or wiper on the interior side of the reactor housing which prevents flexing of a drive shaft of the scraper or wiper and/or vibration of the drive shaft of the scraper or wiper.

Preference is given to at least two, preferably at least three or at least four, scraper or wiper blades being arranged one behind the other, the same distance apart in the circumferential direction. In the case of two scraper or wiper blades, an angle $\beta=180°\pm5°$, in the case of three scraper or wiper blades an angle $\beta=120°\pm5'$, in the case of four scraper or wiper blades an angle $\beta=90°\pm5°$ and so forth, is obtained in the circumferential direction. This leads to additional centring of the drive shaft of the scraper or wiper.

In a further embodiment, the scrapers or wipers are distributed in axial and tangential direction such that the shaft is likewise axially centred. This is also possible when only 1 scraper or wiper is arranged in circumferential direction. The next scraper in axial direction may be arranged in tangential direction with an angle b of preferably more than 90°, then the next one in axial direction likewise with respect to previous two, and so forth. It is thus possible to achieve centring of a shaft section between two couplings.

In a further embodiment, the tube reactor is connected in the upstream direction to at least one mixing chamber which has a housing surrounding the mixing chamber and at least one mixing element arranged within the mixing chamber.

Suitable mixing elements are adequately known to those skilled in the art and encompass static or movable, preferably movable, mixing elements. The mixing chamber particularly preferably has an impeller. The particular advantage of an upstream mixing chamber is that the starting materials can be mixed with a high mixing energy before entering the tube reactor of the invention, as a result of which the streak formation which is typically observed in the case of viscous reaction mixtures at low temperatures can largely be avoided. Streak formation frequently leads in an undesirable fashion to local hot spots, inhomogeneous occurrence of the reaction or increased secondary reactions. The dimensions of the mixing chamber and of the mixing elements are preferably matched to one another so that an average residence time in the mixing chamber in the range from 1 to 120 s, preferably from 2 to 60 s, particularly preferably from 2 to 20 s, and a very high degree of homogenization can be achieved under the reaction conditions.

Typical mixing energies which are necessary for this can be, for example, in the range from 0.001 to 120 J/l, whereby the mixing energy refers to the energy uptake per liter of starting materials entering the reactor.

Typical mixing powers which are necessary for this can be, for example, in the range from 0.001 to 100 kW/l or 0.001 to 1 kW/l, whereby the mixing power refers to the power consumption of the mixing element per liter of volume of the mixing chamber.

In a preferred embodiment, at least one further heat exchanger for setting a temperature of a flow provided within the mixing chamber is arranged in the axial direction of the housing surrounding the mixing chamber; the abovementioned particular embodiments of heat exchangers apply likewise.

The housing surrounding the mixing chamber is preferably connected to the reactor housing by an intermediate plate having openings for the reaction mixture.

The invention further provides for the use of the above-described tube reactor, which can be configured and developed as described above, for the preparation of synthetic rubbers by polymerization of polymerizable monomers within the reactor housing.

For the purposes of the invention, synthetic rubbers are elastomers which do not occur naturally. Preferred synthetic rubbers are butyl rubber, polybutadiene (BR) and polystyrene-butadiene (SBR), ethylene-propylene-diene rubber (EPDM), polyacrylonitrile-butadiene rubber (NBR), hydrogenated polyacrylonitrile-butadiene rubber (H-NBR), fluoro rubbers (FR), polychloroprene (CR) and polyethylene-vinyl acetate (EVA or EVM), where the abovementioned synthetic rubbers can have, for example, a molar mass of from 5000 to 5 000 000 g/mol.

Particularly preferred synthetic rubbers are butyl rubber and polybutadiene (BR), very particularly preferably butyl rubber having a molar mass of from 300 000 to 1 000 000 g/mol and polybutadiene (BR) having a molar mass of from 5000 to 1 000 000 g/mol, with butyl rubber having a molar mass of from 300 000 to 1 000 000 g/mol being more preferred.

Butyl rubber is a copolymer of isobutene (2-methylpropene) and isoprene (2-methyl-1,3-butadiene). The proportion of repeating units derived from isoprene in the butyl rubber is, for example, in the range from >0% to 5%, preferably from 1.8 to 2.3 mol %.

The polymerization is typically carried out as a copolymerization of isobutene and isoprene at temperatures of from −100° C. to −30° C., preferably from −100° C. to −40° C. and particularly preferably from −100° C. to −60° C., in the presence of a catalyst. As solvents, it is possible to use, for example, chloromethane for the "slurry process", hydrocarbons such as, in particular, open-chain or cyclic, branched or unbranched pentanes, hexanes or heptanes or mixtures thereof, preferably abovementioned pentanes and hexanes or mixtures thereof, for the "solution process".

As catalysts, it is possible to use, in a manner known per se, aluminium chloride or alkylaluminium halides such as diethylaluminium chloride, ethylaluminium dichloride, dimethylaluminium chloride, methylaluminium dichloride or mixtures thereof, depending on the process conditions. The catalyst or catalysts are, for example, activated using small amounts of protic solvents such as water, hydrochloric acid, hydrogen chloride or aliphatic alcohols and added as a suspension or solution in the solvent to the monomers to be polymerized, with the solvent preferably being the solvent in which the polymerization takes place.

Owing to the structural configuration of the tube reactor, the reaction conditions within the tube reactor along the length of the tube reactor can readily be foreseen and can correspondingly be influenced and controlled readily. Especially at the beginning of the polymerization reaction when a comparatively large amount of starting material and only little product are present, the viscosity of the stream is particularly low, typically 1 mPas. Viscosities are, unless indicated otherwise, determined by means of capillary viscometry at a temperature of 23° C. in accordance with ISO 1628 or based thereon. At the same time, a particularly large quantity of heat of reaction is evolved owing to the large amount of reactants and has to be removed via the reactor housing. Since backflow of polymerized product can be avoided, it is possible to keep the viscosity particularly low in a region in which particularly high heat removal is necessary. Owing to the low viscosity in this region, heat transport in a radial direction can be realized particularly simply, with a heat transfer coefficient k of a few hundred W/m²K being able to be achieved in combination with the scraper. This makes it possible, in particular, to make do with a driving temperature gradient of as little as 30 K or, in another embodiment, as little as 20 K, during cooling of the stream in the region of the reactor housing in which the greatest evolution of heat takes place. Towards the outlet of the tube reactor, the viscosity of the stream increases significantly and can reach a few hundred mPas, so that the heat transfer coefficient is poorer than in the region of the inlet of the tube reactor. However, the poorer heat transfer coefficient arises in a region in which a polymerization reaction occurs only to a small extent, if at all, so that a significantly reduced quantity of heat is evolved in the polymerization and would have to be removed. Owing to the smaller quantities of heat to be removed, the higher viscosity and the poorer heat transfer coefficient do not have a significant adverse effect on the cooling of the stream.

In one embodiment of the invention with circulating flow the medium viscosity of the reactor content is in the range of ten to thousand mPas. Despite higher viscosities, the removal of depositions or the renewal of the barrier layer at the heat transfer areas at the interior side of the reactor or at the middle axis or at the stators or at the scrapers and wipers increases the heat transfer coefficient on the side of the product significantly such that also in this embodiment high quantities of heat can effectively be removed.

The invention further provides a process for the continuous preparation of polymers, preferably synthetic rubbers, using a reactor which can be configured and developed as described above. The invention further provides for the use of the reactor for preparing polymers, preferably synthetic rubbers.

In an embodiment of the process, essentially plug flow of the starting materials and products along the geometric central axis of the reactor housing, optionally in the vertical or horizontal direction, is established for the continuous preparation of polymers, preferably synthetic rubbers, in the reactor, especially a tube reactor. Any solids or gels depositing on an interior side of a reactor housing of the tube reactor during the polymerization are scraped off by the rotational movement of the scraper and the scraper blades. The scraping-off of the gel from the interior side of the reactor housing avoids a deterioration in the heat transfer coefficient of the stream within the reactor housing and the reactor housing over time. At the same time, any stators used to scrape or wipe the coolable shaft may act as baffles and hence enhance the redispersing action of the rotating scrapers or wipers. This leads to constant boundary conditions which are advantageous for continuous operation of the tube reactor. At the same time, good heat transfer between the stream and the reactor housing is ensured by the scraping or wiping. The plug flow and if appropriate the action of the stators makes it possible to largely eliminate gravity effects in the stream, for example in the case of loop flow, since the flow component imparted by the scraper in the radial direction significantly outweighs gravity effects. This allows a foreseeable and adjustable reaction profile over the length of the tube reactor in the flow direction, which can be monitored and influenced in a targeted manner at predetermined positions. This makes it possible, in particular, to achieve a desired molecular weight with a comparatively small scatter. The molecular weight reported is, unless indicated otherwise, the weight average molar mass $M_w$ determined by gel permeation chromatography (GPC). In particular, the molecular weight distribution can be set and modified in respect of its position, width and shape by means of cooling of the tube reactor set individually in regions.

Particular preference is given to establishing different heat exchanger temperatures in the flow direction to set a predefined molecular weight taking into account the heat balances, residence times and concentrations prevailing in the polymerization. In particular, it is possible, taking into account the kinetics of the polymerization reaction, to calculate the quantities of heat occurring along the tube reactor in order to set, in particular, a constant temperature of the stream. As a result of the different heat exchanger temperatures in the flow direction, the heat of reaction evolved can be removed in the case of an exothermic reaction or supplied in the case of an endothermic reaction for each region in the axial direction of the tube reactor. In the case of an endothermic reaction, a negative heat of reaction is obtained in the heat balance, while a positive heat of reaction is obtained in the heat balance in the case of an exothermic reaction.

The scraping-off of the gel is particularly preferably effected at a velocity v at the interior side of a reactor housing such that $0.05 \text{ m/s} \leq v \leq 10 \text{ m/s}$, preferably $0.5 \text{ m/s} \leq v \leq 6 \text{ m/s}$, particularly preferably $1 \text{ m/s} \leq v \leq 4 \text{ m/s}$ and very particularly preferably $2 \text{ m/s} \leq v \leq 3 \text{ m/s}$. At such velocities v at which a scraper or wiper blade can run along the interior side of the reactor housing, formation of a significantly thick coating due to solids or gel formation on the interior side of the reactor housing is avoided. At the same time, sufficiently high mass transfer in the radial direction can be established at such velocities of the scraper or wiper blade in the circumferential direction, which leads to good homogeneous mixing of the stream in the radial direction and improves heat transfer between the stream and the reactor housing.

When an upstream mixing chamber is used, the average residence time in the mixing chamber is, for example, in the range from 1 to 120 s, preferably from 2 to 60 s, particularly preferably from 2 to 20 s.

When an upstream mixing chamber is used, the average mixing energy taken up is, for example, in the range from 0.001 to 120 J/l.

The mixing power typically introduced may, based on the energy absorption of the mixer, for example, be from 0.001 to 100 kW/l.

BRIEF DESCRIPTION OF THE DRAWINGS

The invention is illustrated below by preferred embodiments with reference to the accompanying drawings.

The drawings show.

Figure 1:
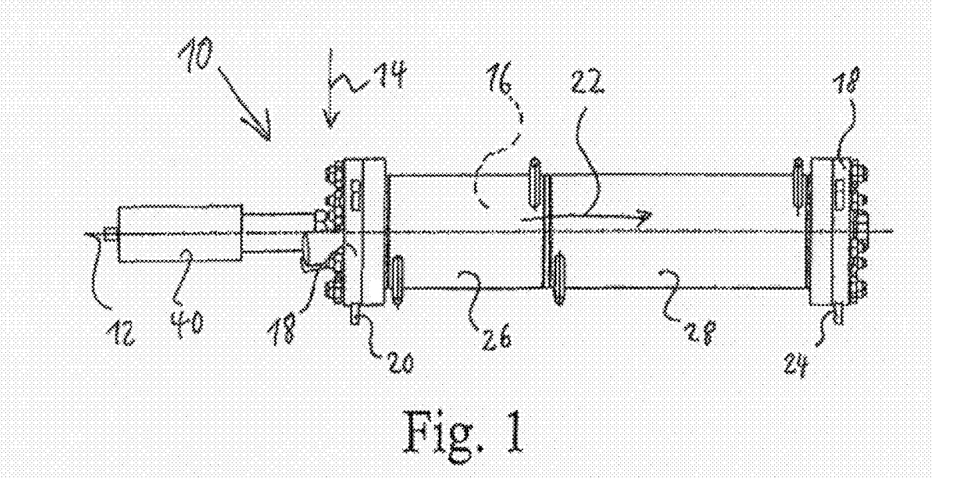
FIG. 1: a schematic side view of a tube reactor.
Figure 11:
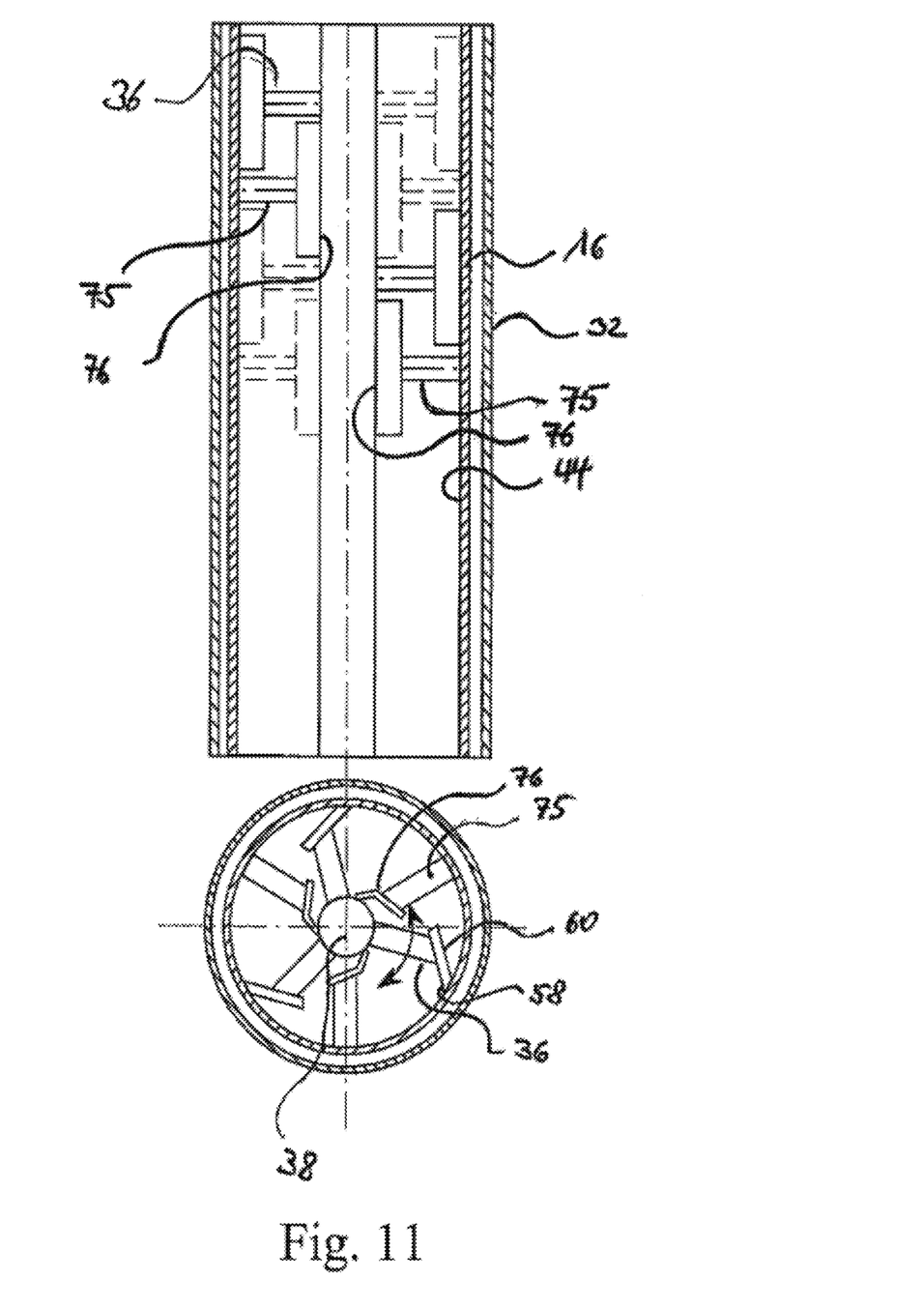
Figure 12:
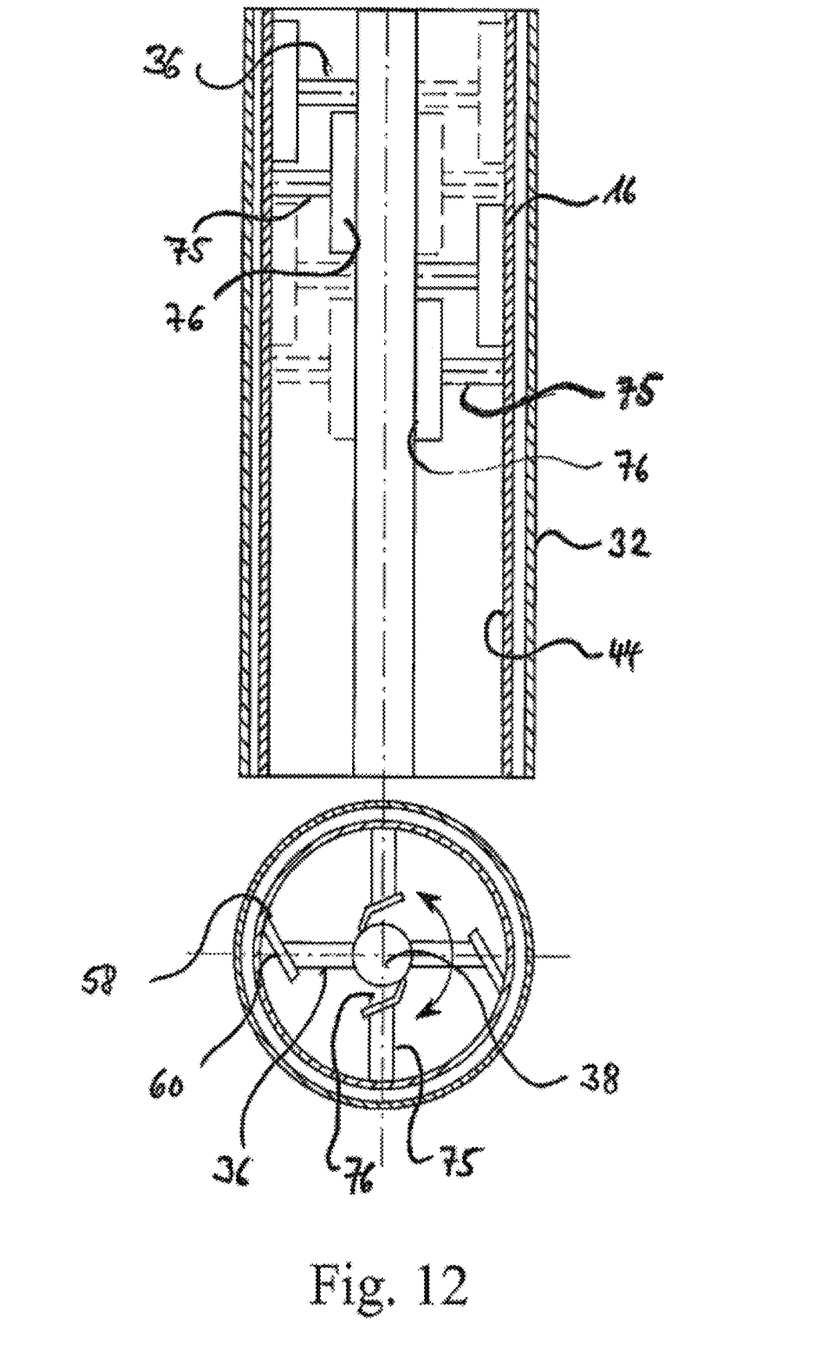

FIG. 11: a schematic side and cross-sectional view of a reactor chamber with 3 stators and 3 scrapers or wipers FIG. 12: a schematic side and cross-sectional view of a reactor chamber with 2 stators and 2 scrapers or wipers The reactor 10 depicted in FIG. 1 has a geometric central axis 12 which is aligned perpendicularly to a direction of gravity 14, i.e. horizontally. The reactor 10 has a tubular reactor housing 16 which is closed at the end faces by flanged-on end plates 18. Starting materials can be introduced into the tubular reactor housing 16 via at least one inlet 20, with the polymerization reaction occurring along a flow direction 22. The product formed can leave the reactor 10 via an outlet 24. Plug flow which has a velocity vector in the radial direction which is essentially equal in magnitude to that in the flow direction 22 is established for the flow within the reactor housing 16. The reactor 10 is thus operated continuously for carrying out a continuous polymerization.

The heat of reaction arising in the polymerization can be removed via a first heat exchanger 26 and a second heat exchanger 28 arranged adjacent in the axial direction to the first heat exchanger 26. Since a more intensive reaction takes place at the beginning of the reactor housing 16, i.e. upstream, than at the end of the reactor housing 16, i.e. downstream, a greater heat flow per unit length in the flow direction 22 arises at the beginning of the reactor housing 16, i.e. upstream, than occurs downstream. The first heat exchanger 26 is therefore designed for a correspondingly high heat transfer power. In addition or as an alternative, the first heat exchanger 26 can cool a shorter distance in the axial direction than the second heat exchanger 28. Owing to the plug flow which can be established in the flow direction 22 within the reactor housing 16, the heat transfer power, the axial extension, the heat transfer medium used and the pressure and temperature of the heat transfer medium can be matched individually to the reaction conditions which change in the flow direction 22 within the, so that a suitable cooling power can be set for each section in the flow direction 22. This makes it possible, in particular, to set an essentially constant temperature within the tube reactor 10, leading to a polymerization product having a desired molecular weight distribution.

Figure 2:
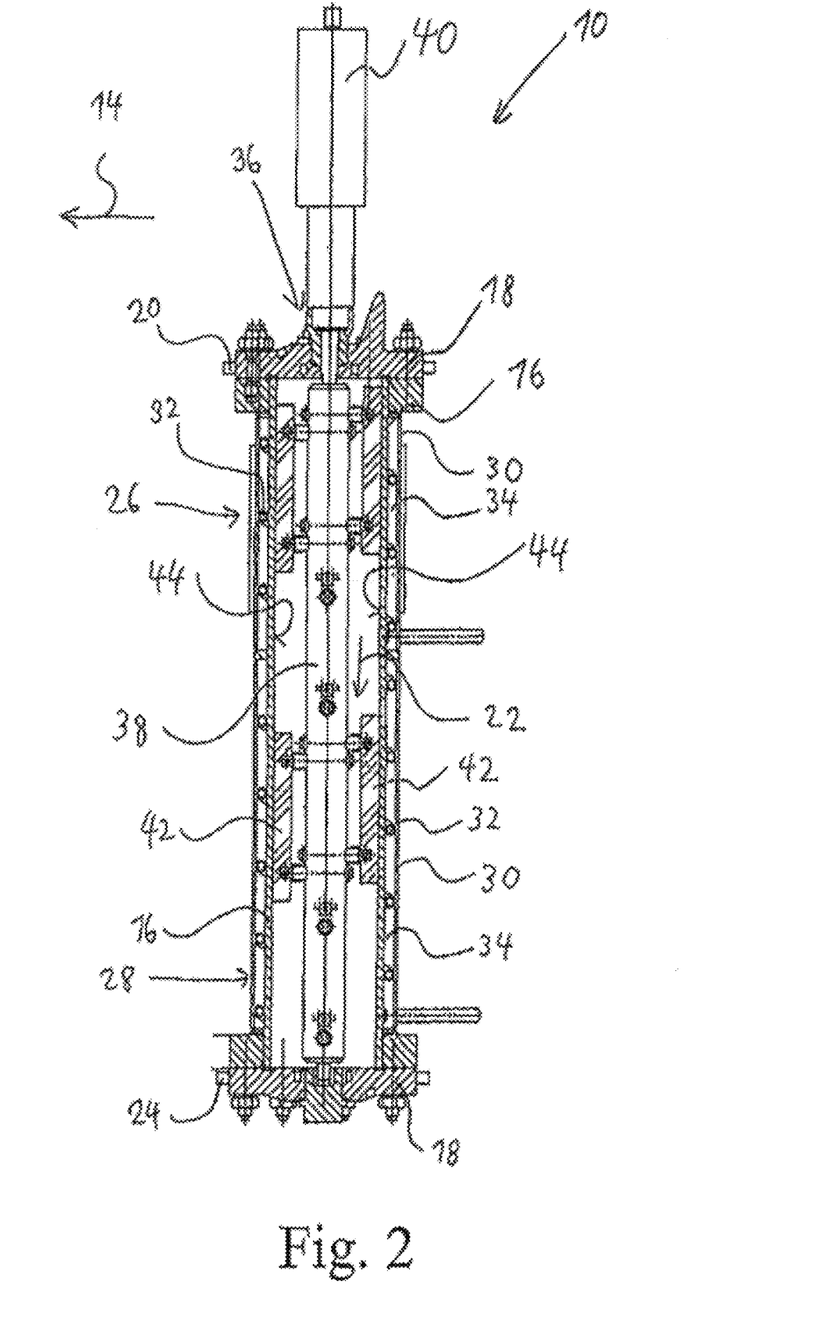
FIG. 2: a schematic sectional view of the tube reactor of FIG. 1.

As shown in FIG. 2, the heat exchangers 26, 28 each have an outer wall 30 which together with the reactor housing 16 bounds the volume of the heat exchanger 26, 28. A spiral dividing wall 32 in the form of a coiled tube which bounds a spiral heat exchanger channel 34 is arranged between the outer wall 30 and the reactor housing 16. When a heat transfer medium which undergoes a phase change during operation, for example vaporizing ethylene, is used, the dividing wall 32 can be omitted. The reactor 10 also has a scraper or wiper 36 which has a drive 38 driven by a motor 40. A plurality of scraper or wiper blades 42 are connected to the drive 38; in the example shown, these are arranged in pairs opposite one another. However, it is also possible for a plurality of scraper or wiper blades 42, in particular three scraper or wiper blades 42, to be arranged regularly one after the other in the circumferential direction. In the example depicted, pairs of scraper or wiper blades 42 which are adjacent in the axial direction are offset by 90° in the circumferential direction. The scraper or wiper blades 42 contact an interior side 44 of the reactor housing 16 in order to be able, in particular, to scrape off encrustations or gels from the interior side 44.

Figure 3:
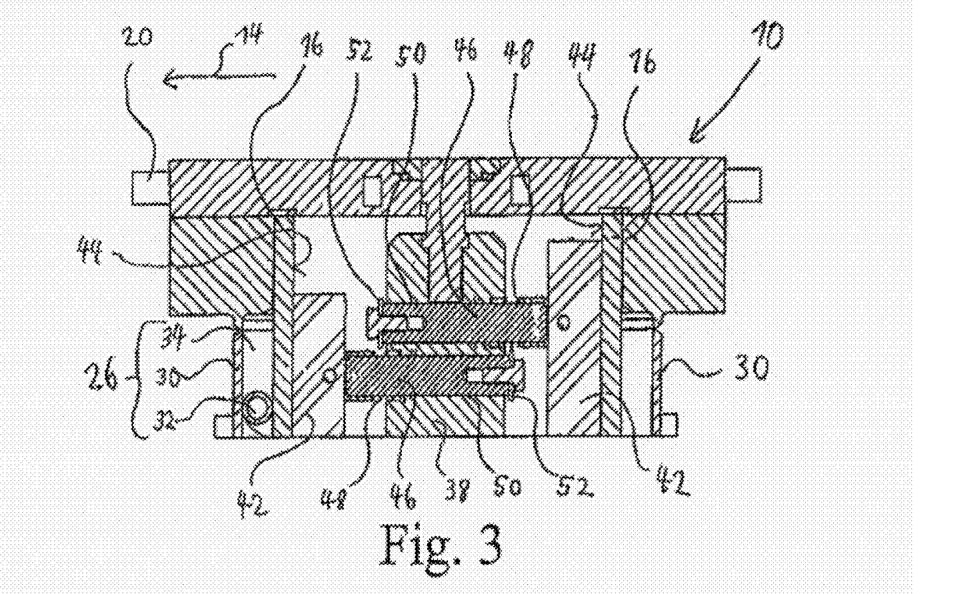
FIG. 3: a schematic detailed view of the tube reactor of FIG. 2.

As shown in FIG. 3, the scraper or wiper blades 42 have a fastening head 46 which rests via a spring 48 against the drive 38. In this way, the scraper or wiper blades 42 can apply an axial spring force to the interior side 44 of the reactor housing 16. The fastening head 46 is here plugged into a hole 50 held securely at the end face by means of a screw lid 52.

Figure 4:
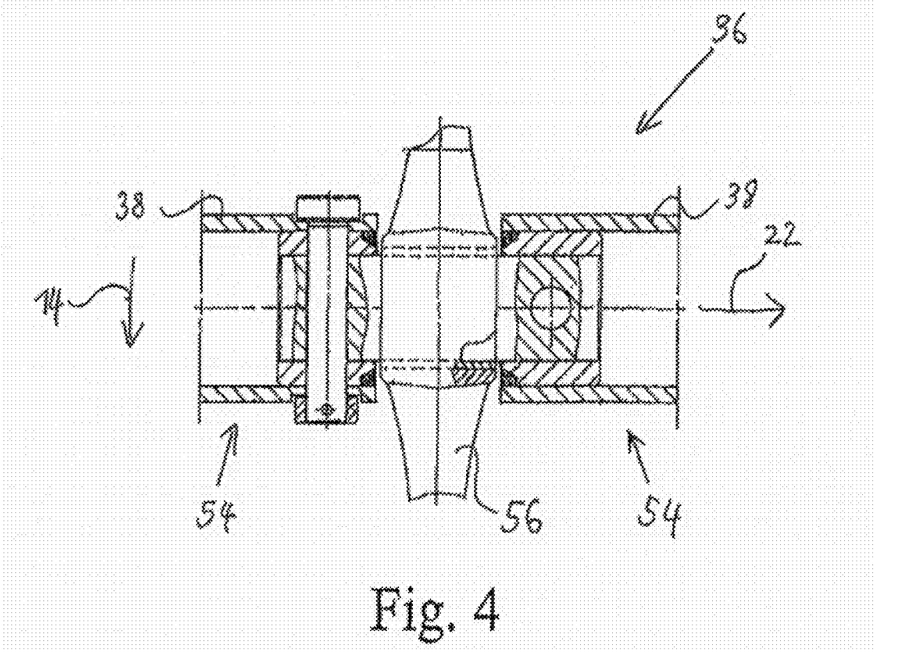
FIG. 4: a schematic detailed view of a scraper for the tube reactor depicted in FIG. 1 and FIG. 5: a schematic sectioned view of a scraper blade for the scraper of FIG. 4.

As shown in FIG. 4, the scraper or wiper 36 can have a plurality of subscrapers oder subwipers 54 which can, in particular, be connected to one another, in particular in an articulated fashion, via a tripod 56 (shown in part). The articulated connection enables the scraper 36 to compensate for curvatures in the reactor housing 16 caused, for example, by thermal expansion and ensure essentially parallel contact of the scraper or wiper blade 42 with the interior side 44 of the reactor housing 16.

Figure 5:
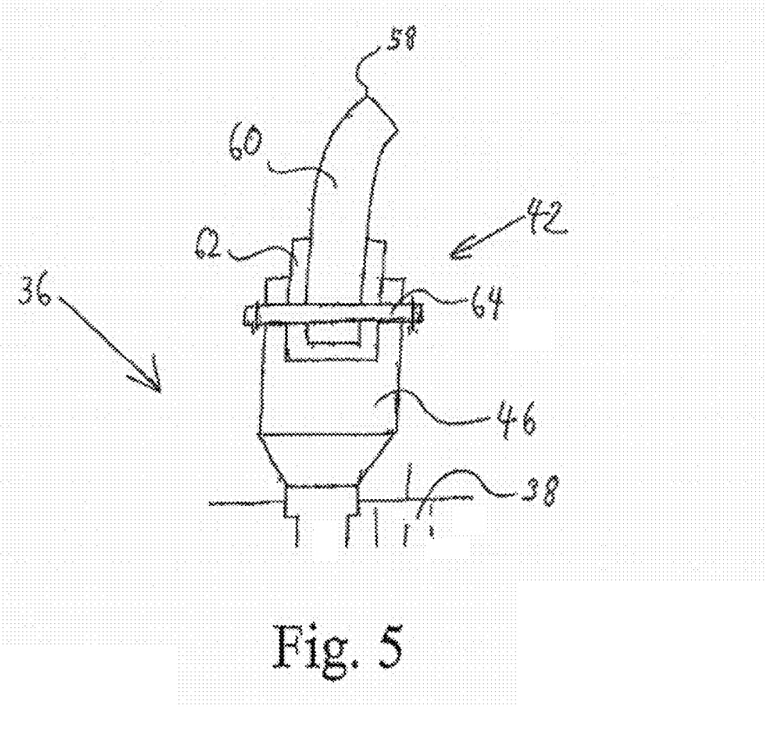

As shown in FIG. 5, the scraper or wiper blade 42 can be inclined and/or curved at its radially outward-directed end. This gives a line-shaped scraper or wiper edge 58 which can run along, i.e. slide along, the interior side 44 of the reactor housing 16. The scraper or wiper blade 42 has, in particular, a PTFE-coated curved scraper or wiper element 60 which is clamped into a holder 62 made of stainless steel and is connected via a secured holding pin 64 to the fastening head 46.

Figure 6:
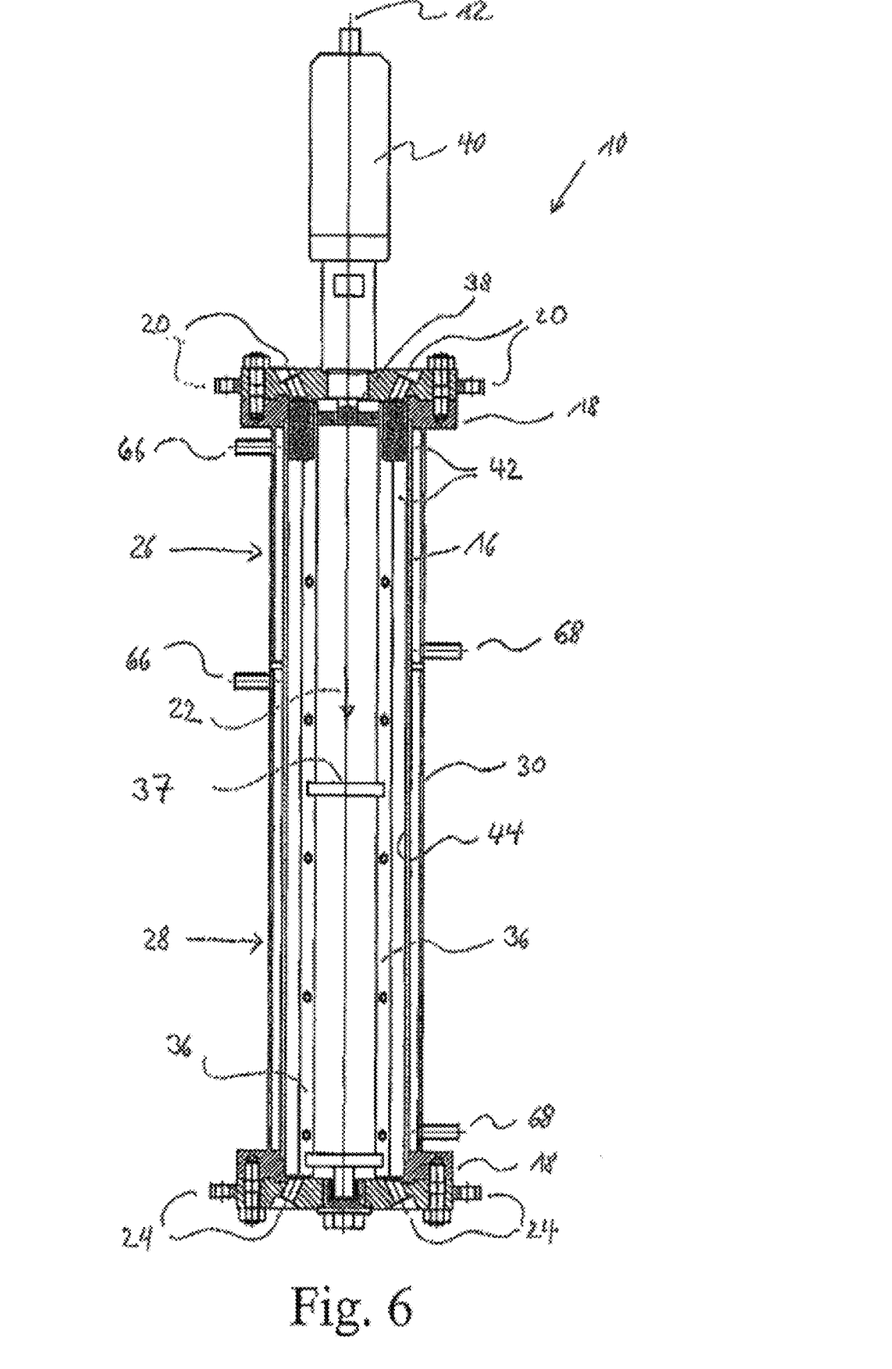
FIG. 6: a schematic side view of a further tube reactor without a central shaft

As shown in FIG. 6, a plurality of scrapers or wipers 36 are joined to the drive 38 in such a way that force transmission to the scrapers or wipers 36 occurs without a central shaft. The surface of a central shaft represents an unscraped or unwiped surface having a low circumferential velocity relative to the scraper velocity. The absence of such a surface has the advantage that an overall smaller amount of undesirable adhering gels or solids is observed. To stabilize the scrapers or wipers mechanically, these can be joined to one or more connecting elements 37. The structural design depends, inter alia, on the selected reactor geometry and also the circumferential velocity of the scrapers and can easily be optimized in a manner known to those skilled in the art.

Figure 7:
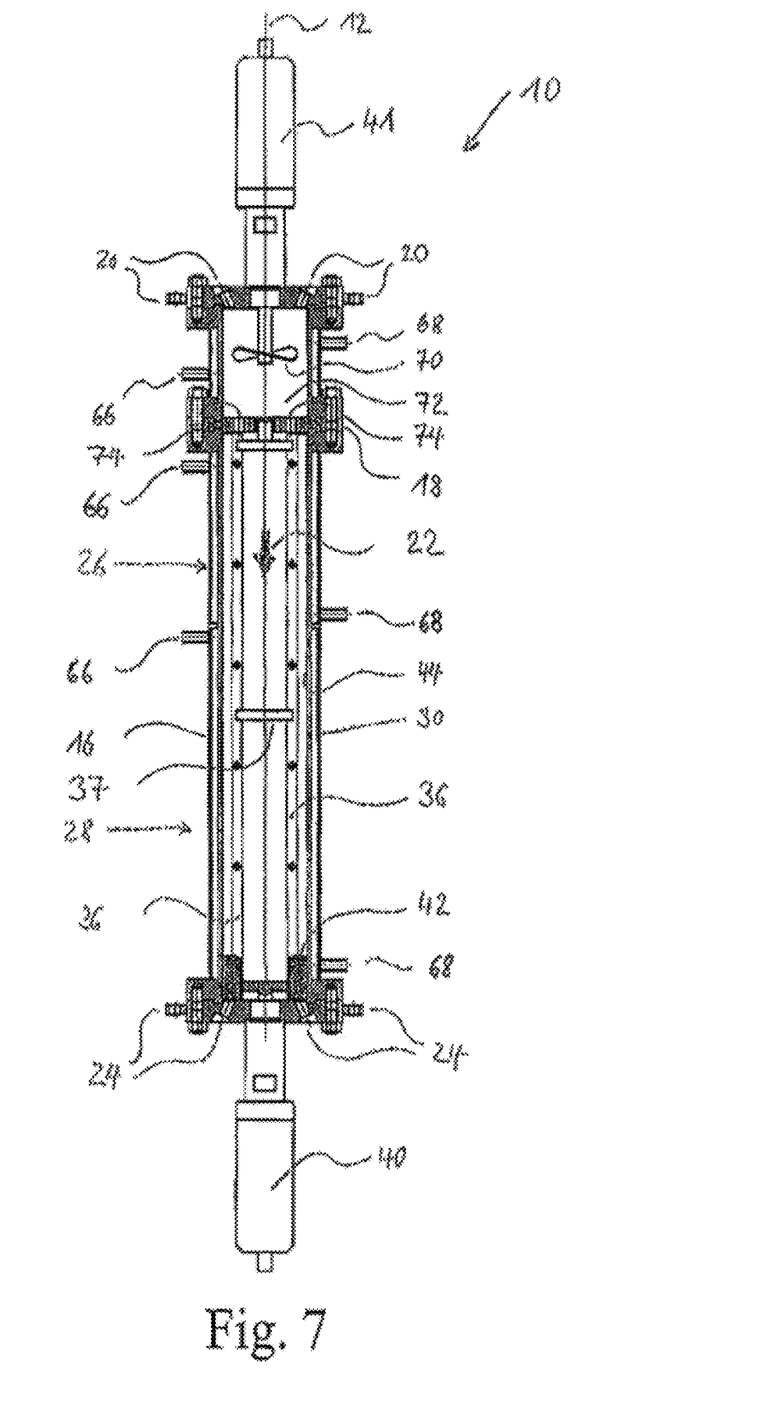
FIG. 7: a schematic side view of a further tube reactor with upstream mixing chamber

As shown in FIG. 7, the reactor 10 has a mixing chamber 72 upstream, i.e. in a preceding position, which mixing chamber 72 has a housing surrounding the mixing chamber and a mixing element 70 arranged within the mixing chamber, which element is here configured as an impeller driven by a motor 41. The mixing chamber likewise has an outer wall which bounds the volume of a heat exchanger, with heat transfer medium being able to be introduced into the heat exchanger via the inlet 66 and can be taken off again via the outlet 68 for the heat transfer medium, so that the mixing chamber can be separately cooled or heated. In the preparation of synthetic rubbers, cooling typically takes place to a temperature in the range from −100° to −30° C. The mixing chamber is bounded in the flow direction by the end plate 19 of the tube reactor, but mass transfer from the mixing chamber 72 into the interior space of the tube reactor can occur via one or more, in the present figure two, openings 74.

Figure 8:
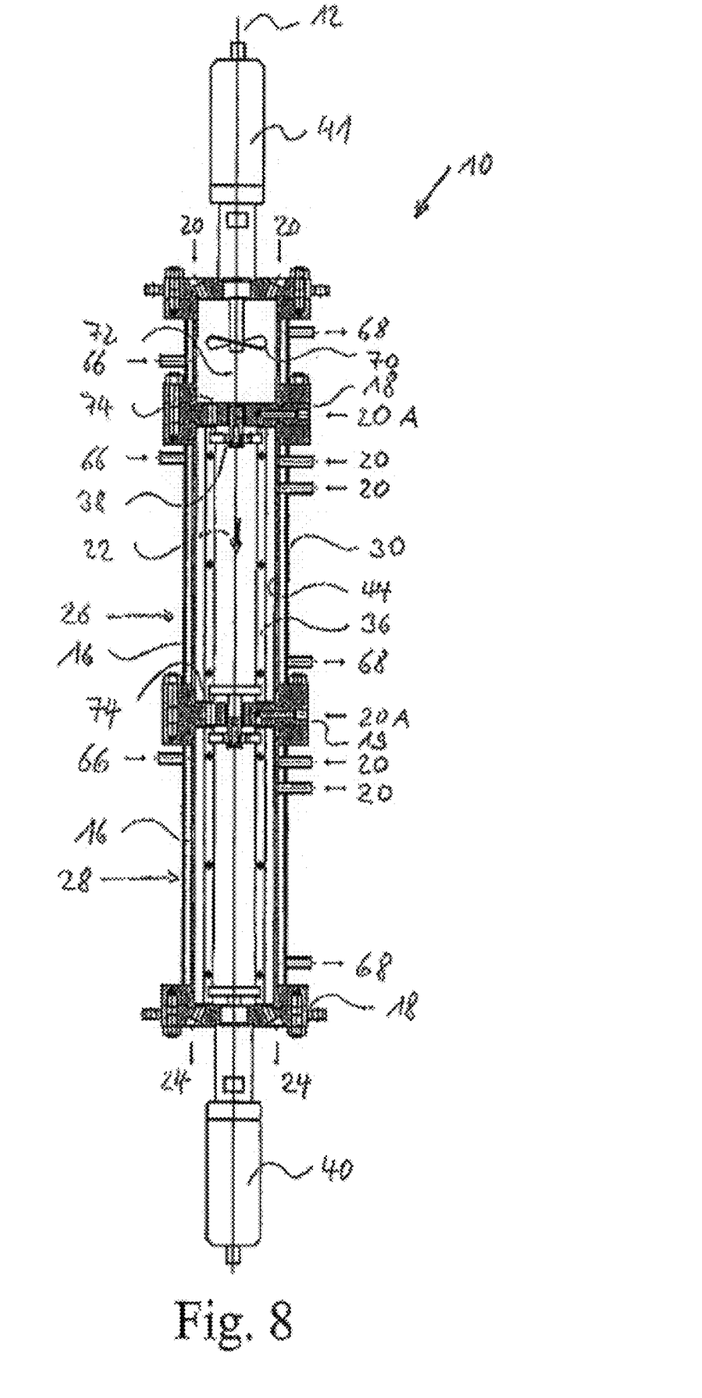
FIG. 8: a schematic side view of a further tube reactor with upstream mixing chamber and a second reactor space

As shown in FIG. 8, the tube reactor 10 can be divided into two or more, in the present figure two, separate reaction chambers which are in each case separated from one another by an intermediate plate 19, but with mass transfer in the flow direction being made possible by openings 74. Both in the end plate 18 which is arranged between the mixing chamber and the first reactor space and in the intermediate plate 19 there are inlets 20A for further starting materials such as solvents, catalysts or monomers. Further inlets 20 are located at the beginning, viewed in the flow direction, of the respective reactor space. The inlets 20A and 20 have the advantage that they enable the reaction parameters to be influenced in a desired way. Thus, the addition of solvent, for example, can reduce the viscosity of the reaction medium, the addition of further amounts of monomers or other monomers or the addition of catalyst can alter the chain length and/or structure of the polymer.

Figure 9:
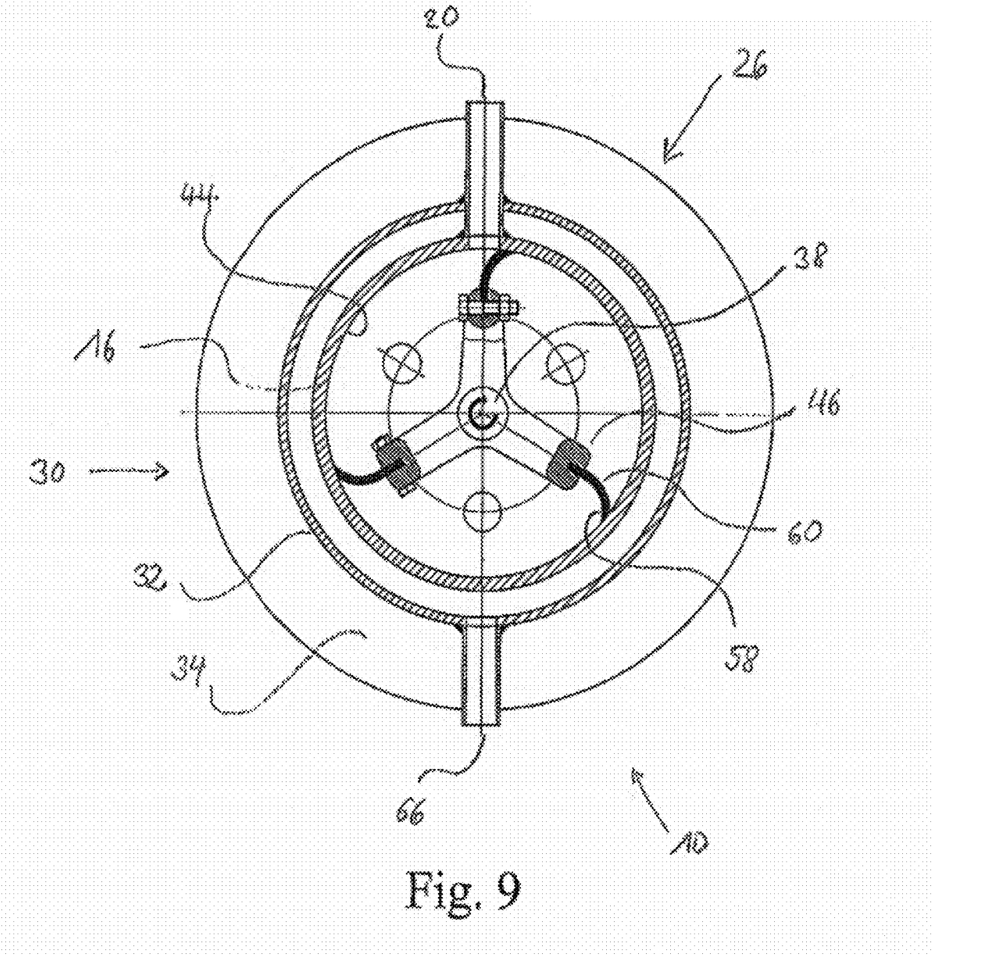
FIG. 9: a schematic cross-sectional view of a tube reactor (as a scraper)

As shown in the cross-sectional view in FIG. 9, the scraper edges 58 of the scraper elements 60 which are joined via the fastening heads 46 to the drive 38 scrape the interior side 44 of the reactor housing in the circumferential direction. The introduction of starting materials occurs via an inlet 20. The outer wall 30 and the reactor housing 16 bound the volume of the heat exchanger 26. The spiral dividing wall 32, provided here in the form of a coiled tube, bounds a spiral heat exchanger channel 34 into which heat transfer medium can be fed via the inlet 66.

Figure 10:
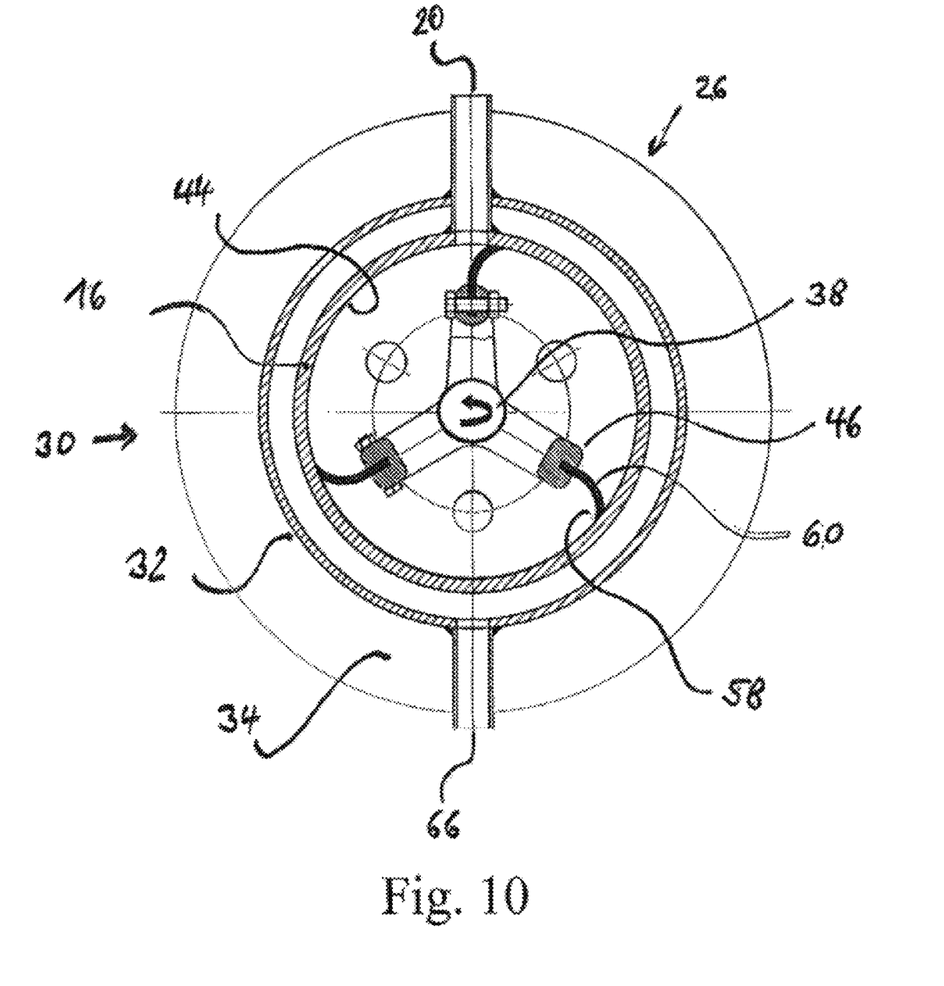
FIG. 10: a schematic cross-sectional view of a tube reactor (as a wiper)

The cross-sectional view in FIG. 10 is substantially identical to FIG. 9, except that the device is equipped with wipers. The wiper edges 58 of the wiper elements 60, which are connected to the drive 38 via the fastening heads 46, wipe the inside of the reactor housing in circumferential direction.

In FIG. 11, the tubular reactor housing 16 is connected on the inside of the reactor housing 44 to three stators 75, which are in turn equipped, according to the circumferential direction, with scraper or wiper elements 76, which scrape or wipe the drive 38, which is configured here as a centre shaft, in operation. In addition, the drive 38 has, according to the circumferential direction, three scrapers or wipers 36, which are each offset by 120° in the working example shown.

In FIG. 12, analogously to FIG. 11, the reactor chamber is, however, equipped only with two stators 75 and two scrapers or wipers 36, which are each offset by 180°.

A list of reference numerals is given below:
10 Reactor
12 Geometric central axis
14 Direction of gravity
16, 44 Tubular reactor housing (16), interior side of the reactor housing (44)
18 End plates
19 Intermediate plate
20 Inlets
22 Flow direction
24 Outlets
26 First heat exchanger
28 Second heat exchanger
30 Outer wall
32 Spiral dividing wall
34 Spiral heat exchanger channel
36 Scraper or Wiper
37 Connecting element
38 Drive
40, 41 Motor
42 Scraper or wiper blades
46 Fastening head
48 Spring
50 Hole
52 Lid
54 Subscraper or Subwiper
56 Tripod
58 Scraper or wiper edge
60 Scraper or wiper element
62 Holder
64 Holding pin
66 Inlet for heat transfer medium
68 Outlet for heat transfer medium
70 Mixing element (here: impeller)
72 Mixing chamber
74 Openings
75 Stator
76 Scraper or wiper element of a stator

What is claimed is:

1. Reactor for the continuous preparation of polymers, in particular synthetic rubbers, comprising
   a central shaft running essentially along the geometric central axis (12)
   at least one essentially tubular reactor housing (16) having a drive (38) which is connected to at least one scraper or wiper (36) which is arranged so as to be rotatable within the reactor housing (16), where the scraper or wiper (36) has at least one scraper or wiper blade (42) to run along an interior side (44) of the reactor housing (16) and
   at least one stator (75) configured such that the have a distance from the central shaft of 0 to 1% based on the radial diameter of the reactor housing.

2. Reactor according to claim 1, characterized in that the geometric central axis (12) is essentially horizontal or essentially vertical.

3. Reactor according to 1 or 2, comprising a central shaft running essentially along the geometric central axis through which tempering media can flow.

4. Reactor according to claim 1 wherein the scrapers or wipers (36) are configure such that that they have a distance from the interior side (44) of the reactor housing (16) of 0 to 1% based on the radial diameter of the reactor housing.

5. Reactor according to claim 1, wherein characterized in that the reactor housing (16) is connected to a transport device for transporting starting materials into the reactor housing (16) and/or for transporting products out of the reactor housing (16).

6. Reactor according to claim 1 wherein at least two heat exchangers (26, 28) for setting the temperature of a flow provided within the reactor housing (16) are arranged in the axial direction of the reactor housing (16), where the heat exchangers (26, 28) are separated from one another in such a way that a different temperature can be set for each heat exchanger (26, 28).

7. Reactor according to claim 3, wherein the heat exchanger (26, 28) has an outer wall (30) surrounding part of the reactor housing (16) and in particular a spiral dividing wall (32) is arranged between the outer wall (30) and the reactor housing (16) to form a spiral heat exchanger channel (34).

8. Reactor according to claim 1, wherein ratio of an inner area A of the tubular reactor housing (16) to a volume V of the tubular reactor housing (16) is such that $0.1\ m^2/m^3 \leq A/V \leq 100\ m^2/m^3$.

9. Reactor according to claim 1, wherein the scraper or wiper (36) has at least two subscrapers or subwipers (54) which are connected to one another in an articulated manner in the axial direction.

10. Reactor according to claim 1, characterized in that the scraper or wiper (36) can be driven via a drive (38) and the drive (38) is sealed by means of a double-acting sliding ring seal arranged between the drive (38) and the reactor housing (16), where the sliding ring seal contains, in particular, a barrier medium which is inert under the polymerization conditions.

11. Reactor according to claim 1, characterized in that the scraper or wiper blade (42) has a surface having a coefficient of friction which is lower than that of steel.

12. Reactor according to claim 1, wherein the scraper or wiper blade (42) is inclined and/or curved relative to a radially directed line running through the geometric central axis (12), where the scraper or wiper blade (42) has a fastening head (46) directed radially inward and a radially outward-directed force, in particular spring force, can be applied to the scraper or wiper blade (42), in particular to the fastening head (46).

13. Reactor according to claim 1, wherein at least two scraper or wiper blades (42) are arranged in the axial direction, where the scraper or wiper blades (42) are offset by an angle α in the circumferential direction and the angle α is in particular such that $30°\leq\alpha\leq150°$, preferably $45°\leq\alpha\leq135°$, more preferably $60°\leq\alpha\leq120°$ and particularly preferably $\alpha=90°\pm2°$.

14. Reactor according to claim 1 to wherein the reactor is connected in the upstream direction to at least one mixing chamber (72) which has a housing surrounding the mixing chamber and at least one mixing element (70) arranged within the mixing chamber.

15. Reactor according to 14, wherein the mixing element (70) is an impeller.

16. Reactor according to claim 1, wherein the scrapers or wipers (36) and/or the optionally present stators (75) are configured to promote redispersion of unscraped or unwiped material.

17. Use of a reactor according to claim 1 for polymerization of polymerizable monomers.

18. Use according to claim 17, characterized in that the polymers are synthetic rubbers.

19. Process for the continuous preparation of polymers by polymerization of polymerizable monomers, characterized in that, the polymerization is carried out in a reactor according to claim 1.

20. Process according to claim 19, characterized in that the reactor is
   essentially plug flow in the axial direction is imparted to the starting materials and the products or
   essentially circulation flow of the reactants and of the products is imparted to the starting materials and the products and
   any solids or gels deposited are mechanically removed from an interior side (44) of a reactor housing (16) of the tube reactor (10) during the polymerization.

21. Process according to claim 20, characterized in that mechanical removal is effected by wiping or scraping.

22. Process according to claim 20, wherein different heat exchanger temperatures are established in the flow direction in order to set a predetermined molecular weight taking into account the heat balances, residence times and concentrations occurring during the polymerization.

23. Process according to claim 20, wherein the scraping-off of any deposited solids or gels is carried out at a velocity v at the interior side (44) of the reactor housing (16) such that $0.05\ m/s \leq v \leq 10\ m/s$.

24. Process according to claim 20, characterized in that the starting materials are mixed by means of a mixing element (70) with a mixing energy of from 0.001 to 120 J/l.

25. Process according to claim 20, characterized in that the starting materials are mixed by means of a mixing element (70) with a mixing power of from 0.001 to 100 kW/l in a mixing chamber 72 before entering the tube reactor.

* * * * *